United States Patent [19]

Sato et al.

[11] 4,273,007
[45] Jun. 16, 1981

[54] TRANSMISSION FOR AGRICULTURAL TRACTOR

[75] Inventors: Mitsuhiro Sato; Hiroshi Itatani; Kenji Matsuda, all of Sakai, Japan

[73] Assignee: Kubota, Ltd., Osaka, Japan

[21] Appl. No.: 26,105

[22] Filed: Apr. 2, 1979

[30] Foreign Application Priority Data

Apr. 21, 1978 [JP] Japan .............................. 53-53779[U]
Apr. 21, 1978 [JP] Japan .............................. 53-53783[U]

[51] Int. Cl.³ .............................................. F16H 3/02
[52] U.S. Cl. ........................................ 74/745; 74/331; 74/606 R; 74/DIG. 11
[58] Field of Search ................. 74/15.86, 745, 606 R, 74/331, 342, 344, DIG. 11, 340

[56] References Cited
U.S. PATENT DOCUMENTS

| 2,010,161 | 8/1935 | Robbins | 74/331 X |
| 2,913,064 | 11/1959 | Ferguson et al. | 74/DIG. 11 |
| 3,864,990 | 2/1975 | Lacoste | 74/606 R |

Primary Examiner—C. J. Husar
Assistant Examiner—Frank McKenzie
Attorney, Agent, or Firm—Edwin E. Greigg

[57] ABSTRACT

An agricultural tractor transmission to which various attachments may be removably affixed as necessary. Such attachments include a super reduction device and a pump for actuating a work implement.

4 Claims, 1 Drawing Figure

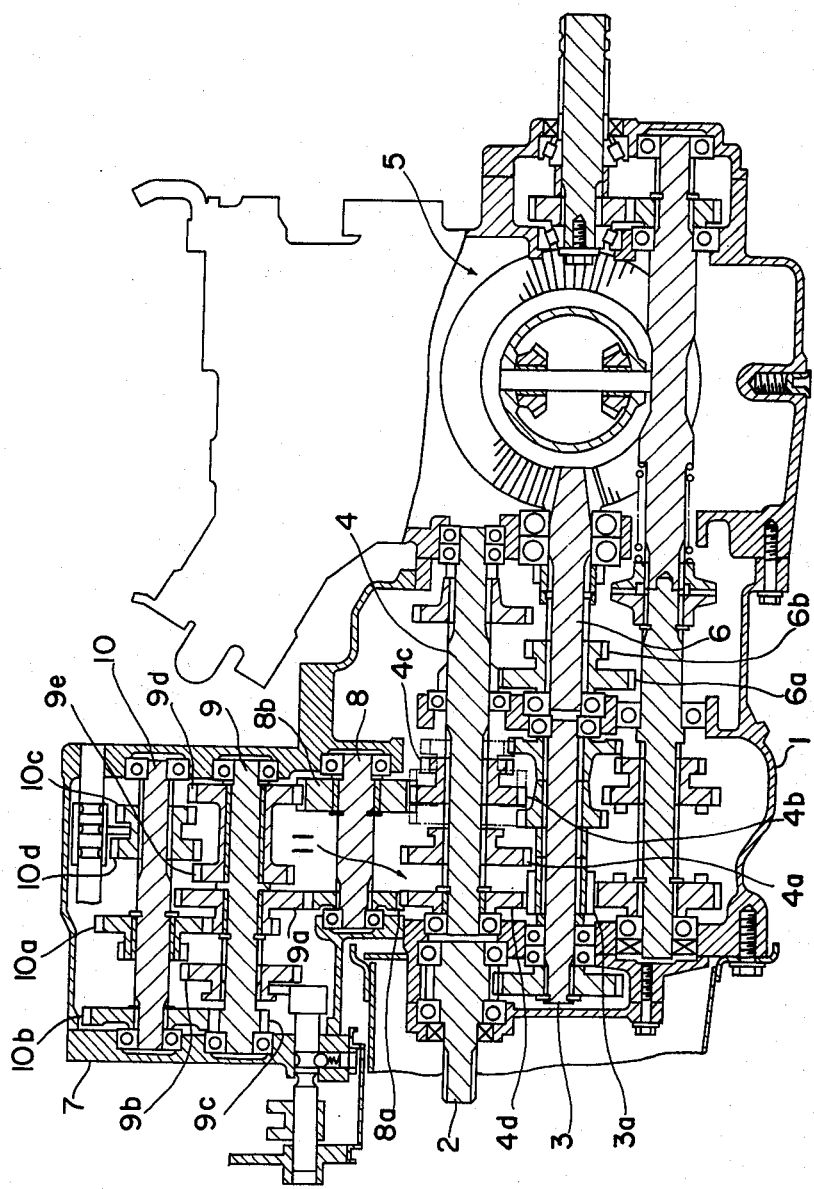

TRANSMISSION FOR AGRICULTURAL TRACTOR

BACKGROUND OF THE INVENTION

This invention relates to transmissions for agricultural tractors.

The agricultural tractor requires special devices for certain types of operation which are not necessary for regular operation. Such devices include an auxilliary speed change device to provide a travelling speed, such as ultra-slow travelling, that is outside a normal range of main speed changes, and a hydraulic pumping device to actuate an attached work implement.

However, the agricultural tractor permanently equipped with a number of such devices to meet various requirements has a complicated construction as a whole. In addition to the problem of high manufacturing cost, the great total weight of the tractor tends to affect efficiency.

SUMMARY OF THE INVENTION

In view of the above situation, this invention has for the primary object to eliminate the problem of complicated construction of the agricultural tractor leading to a high manufacturing cost and poor working efficiency. To this end this invention provides a transmission arranged to be connected with the foregoing devices which can be replaced as necessary.

More particularly, a transmission for agricultural tractor according to this invention comprises main speed change means including shift gears for main speed changes and a constant drive gear for power takeoff disposed in a position inside a transmission case and adjacent to the outside thereof, an opening defined in the transmission case to expose the drive gear and at least one of the shift gears, and a power transmitting device removably attached to the transmission case and adapted to be driven by the drive gear.

An agricultural tractor transmission as arranged above permits different replaceable devices to be mounted by removably attaching them to the main speed change device of the transmission as required for specific types of operation. Thus, various types of operation can be carried out by employing suitable devices without the above noted problems found in the tractor pre-equipped with all those devices, namely the problems of a complicated overall construction at high manufacturing cost and a great total weight likely to lower working efficiency of the tractor. Furthermore, by a very simple improvement which consists in providing the transmission with a drive gear and an opening, the arrangement according to this invention can drive a replaceably attached device such as an auxiliary travelling speed change device and a pumping device. This feature achieves great economy and the desired object with ease, and has an immense practical advantage over the case of providing a plural number of drive mechanisms respectively for a plural number of attached devices.

A further object of this invention is to eliminate the inconvenience noted below which arises where the attached device is an auxiliary speed change device adapted to transmit output of the above mentioned drive gear to one of the shift gears for main speed changes after reducing the ratio.

In this case, switching between a state of using the main speed change device and a state of using the auxiliary device is generally effected by bringing the shift gear for main speed changes and an output gear of the auxiliary speed change device into and out of mesh with one another. When switching from the state of using the main speed change device to the state of using the auxiliary speed change device, the shift gear and the output gear are brought from an unengaged condition into mesh with one another, and this operation often lacks smoothness owing to the relative rotatory position between the two gears.

To be more particular, for causing the shift gear for main speed changes to mesh with the output gear, the auxiliary speed change device is held at a neutral free play position and the shift gear is moved into mesh with the output gear while neither is rotating, in order to prevent damage to the gears. However, the relative rotatory position of the two gears is often deviated from that appropriate to meshing, and involves the trouble of positin adjustment by driving the auxiliary speed change device or the main speed change device once again. This adjusting operation to obtain the relative position suitable for meshing may have to be repeated many times because of the indefiniteness of the rotatory position at which the output gear or the shift gear stops after having been driven.

In order to forestall this inconvenience, a transmission according to this invention is characterized in that the auxiliary speed change means is maintained in neutral free rotation when the main speed change means is not in a neutral position whereby output of the main speed change means is transmitted to travelling wheels, and when the main speed change means is in the neutral position output of the auxiliary speed change means is transmitted to the travelling wheels through an output gear of the auxiliary speed change means and one of the shift gears of the main speed change means, at least either of the one shift gear and the output gear having a large width to retain constant meshing between the shift gear and the output gear when the shift gear is in a neutral position.

When operating the shift gear for main speed changes into a position of speed change operation, the auxiliary speed change device is kept in neutral free rotation, and therefore no great problem should arise from the constant meshing between the shift gear for main speed changes and the output gear of the auxiliary speed change device, apart from a small power loss due to the load of driving the auxiliary speed change device. Based on this fact, the two gears are arranged to be in constant interlocking whereby the above noted inconvenience is eliminated and the switching over to the state of using the auxiliary speed change device can now be effected promptly and easily. Such an arrangement achieves the desired object with a simple improvement in which at least either of the shift gear for main speed changes and the output gear is provided with a large width. This feature can be readily put into practice without an extensive modification to the conventional construction.

Other objects and advantages of this invention will be apparent from the following description.

BRIEF DESCRIPTION OF THE DRAWING

The drawing is a side view in vertical section showing, by way of example, a transmission for agricultural tractor according to this invention.

DESCRIPTION OF THE PREFERRED EMBODIMENT

An embodiment of this invention is described below with reference to the drawing.

In the drawing showing a transmission for agricultural tractor, a transmission case 1 contains an input shaft 2 to receive output of an engine (not shown), a first speed change shaft 3, a second speed change shaft 4, and an output shaft 6 interlocking with a differential device 5 for rear wheels (not shown) of the tractor, the shafts 2, 3, 4 and 6 being parallel with one another. These shafts 2, 3, 4 and 6, together with gears mounted thereon, make up a main travelling speed change device.

The input shaft 2 and the first shaft 3 are interlocked by means of gears. The first shaft 3 carries securely fixed thereon a group of speed change gears with which three shift gears 4a, 4b and 4c for main speed changes splined on the second shaft 4 mesh in an alternative manner to provide three forward speeds. The second shaft 4 carries securely fixed thereon a group of gears with which two shift gears 6a and 6b for main speed changes splined on the output shaft 6 mesh in an alternative manner to effect a broad two step change on the above three forward speeds for a high speed range and a low speed range. A backward travelling is obtained, though omitted from the drawing, by moving a first gear 4a of the shift gears 4a, 4b and 4c for main speed changes into mesh with a back gear interlocked with the first shaft 3 to reversely rotate the second shaft 4.

There is a constant drive gear 4d for power takeoff mounted for relative rotation on the second shaft 4 and engaged by a gear 3a fixed on the first shaft 3. The shift gears 4a, 4b and 4c and the drive gear 4d are disposed in a portion of the transmission case 1 adjacent to the top. The top of the transmission case 1 has an opening 11 exposing the drive gear 4d and the shift gears 4a, 4b, 4c, 6a and 6b. An auxiliary speed change device operable as super reduction means is arranged to be removably mounted on the top of the transmission case 1 to transmit output of the drive gear 4d to one of the shift gears 4b at a super reduction ratio.

Details of the super reduction means include a third speed change shaft 8, a fourth speed change shaft 9, and a fifth speed change shaft 10 supported in a casing 7 which is removably attached to the top of the transmission case 1. The third shaft 8 fixedly carries an input gear 8a in mesh with the drive gear 4d. Output received by the input gear 8a is transmitted at a speed reduction ratio to a two step gear 9a mounted for relative rotation on the fourth shaft 9. From the two step gear 9a the output passes at a reduction ratio to a further two step gear 10a mounted for relative rotation on the fifth shaft 10. From the two step gear 10a the output passes at a reduction ratio to a slide gear 9b splined on the fourth shaft 9. Then the output proceeds from a gear 9c fixed on the fourth shaft 9 to a gear 10b fixed on the fifth shaft 10 at a reduction ratio. The output whose speed has now been greatly reduced is subjected to a further reduction while passing to gears 9d and 9e mounted for relative rotation on the fourth shaft 9 by means of two shift gears 10c and 10d splined on the fifth shaft 10, and from the gear 9d to an output gear 8b mounted for relative rotation on the third shaft 8. The output gear 8b is arranged to mesh with a second speed gear 4b of the shift gears 4a . . . for main speed changes.

As described above, the super reduction means transmits the output received by the input gear 8a to the shift gear 4b for main speed changes by way of the output gear 8b after effecting super reduction thereon. Only when the main speed change device stays in a neutral position, the super reduction means is operated into transmission to drive the rear wheels by moving the slide gear 9b into mesh with the two step gear 10a. When the main speed change device is out of the neutral position and the rear wheels are driven by the main speed change device, the super reduction means is switched into a neutral freely rotating state by disengaging the slide gear 9b from the two step gear 10a. The super reduction means is adapted to provide two different speeds by selecting between the shift gears 10c and 10d.

It should be noted that the output gear 8b has a large width in order to stay in constant mesh with the shift gear 4b for main speed changes regardless of the shift positions of the gear 4b.

Although in the foregoing embodiment the super reduction means is described for an example of the auxiliary speed change device, various other arrangements are possible , such as a super overdrive mechanism for example.

While in the foregoing embodiment the auxiliary speed change device itself is adapted to provide two different speeds, it may be arranged switchable for three or more different speeds or not switchable at all.

Further, in the described embodiment the output gear 8b is wider than the gear 4b, but it is possible to arrange conversely so that the gear 4b is wider than the output gear 8b.

By defining the opening 11 in the transmission case 1 to expose the drive gear 4d and all of the speed change gears 4a . . . as described, a selection is conveniently made from the plurality of gears 4a. However, the opening may be the size to expose the drive gear and at least one speed gear.

In the place of the reduction device attached to the transmission case 1 as described, various other devices can be attached thereto such as a hydraulic pump for actuating a hydraulically operated implement.

We claim:

1. A transmission for an agricultural tractor comprising a main transmission casing, a main speed change means disposed within said main transmission casing, said main speed change means including first, second, and third shift gears for main speed changes, a constant drive gear for power take-off disposed within said main transmission casing, said first, second, and third shift gears and said constant drive gear mounted within said main transmission casing on a main common shaft supported at opposite ends by said main transmission casing, said constant drive gear fixed in the axial direction for relative rotation on said common shaft and said first, second, and third shift gears being splined on said common shaft for axial movement relative thereto, an opening in one side of said main transmission casing, said first, second, and third shift gears and said constant speed gear being disposed in relative positions in proximity to said opening in said main transmission casing and exposed thereby; an auxiliary speed change means supported within an auxiliary transmission casing, said auxiliary transmission casing removably secured to said main transmission casing relative to said opening therein, said auxiliary speed change means including an input gear arranged to mesh with said constant drive gear and an output gear so arranged to mesh with one of said shift gears on said main common shaft, said input gear and said output gear mounted on an auxiliary common shaft supported by said auxiliary transmission casing, said output gear being freely rotatable relative to said auxiliary common shaft and said input gear being splined to said auxiliary common shaft for rotation therewith.

2. A transmission as claimed in claim 1 wherein said auxiliary speed change means is maintained in neutral free rotation when said main speed change means is not in a neutral position whereby output of said main speed change means is transmitted to a differential device, and when said main speed change means is in the neutral position output of said auxiliary speed change means is transmitted to said differential device through an output gear (8b) of said auxiliary speed change means and one of said shift gears (4b) of said main speed change means, at least either of said one shift gear (4b) and said output gear (8b) having a large width to retain constant meshing between said shift gear (4b) and said output gear (8b) when said shift gear (4b) is in a neutral position.

3. A transmission as claimed in claim 2 wherein said auxiliary speed change means is super reduction means.

4. A transmission as claimed in claim 2 or 3 wherein said auxiliary speed change means is switchable between different speed change positions.

* * * * *